2,713,535
HERBICIDAL COMPOSITIONS
Tracy M. Patrick, Jr., Melrose, Mass., assignor to Monsanto Chemical Company, St. Louis, Mo., a corporation of Delaware
No Drawing. Application November 6, 1953, Serial No. 390,735
3 Claims. (Cl. 71—2.7)

The present invention provides new and highly valuable herbicidal compositions and methods of destroying or preventing plant growth in which said compositions are employed.

I have found that improved, very efficient herbicidal compositions are obtained when there are prepared oil-in-water emulsions of a chlorine-substituted diene selected from the class consisting of hexachlorocyclopentadiene and hexachlorobutadiene. These hexa-chlorinated dienes are readily available compounds which are obtainable in known manner.

Herbicidal compositions containing hexachlorocyclopentadiene and the hexachlorobutadiene may be made by first preparing a solution of the diene in an organic solvent and then adding the resulting solution to water containing an emulsifying agent to form an emulsion. Because of the very high herbicidal efficiency of the dienes, they are present in the herbicidal composition in only very small concentrations, e. g., in concentrations of from 0.1% to 2% by weight of the total weight of the emulsion. Emulsifying agents which may be employed are those customarily used in the art for the preparation of oil-in-water emulsions. The word "oil" is here used to designate any organic liquid which is insoluble in water. Since hexachlorocyclopentadiene and hexachlorobutadiene are highly stable compounds of little chemical reactivity, they are not affected by either ionic or non-ionic emulsifying agents.

Examples of emulsifying agents which may be used include alkylbenzenesulfonates, long-chained polyalkylene glycols, long-chained succinates, etc. Examples of organic solvents which may be used in preparing the emulsion include hydrocarbon liquids such as kerosene, hexane, benzene and toluene; fatty oils, nitro compounds such as nitrobenzene or nitrobutane, chloro compounds such as carbon tetrachloride or the chlorobenzenes, ketones such as cyclohexanone or methyl ethyl ketone, etc.

The emulsions may be used to destroy already existing plant growth by direct application to the undesirable plants, e. g., by spraying; or the emulsions may be employed to prevent plant growth by application to media which normally support plant growth. When employed to prevent plant growth, for example in parking areas, highway abutments, railway yards, etc., the emulsions may be applied by spraying only the surface of said media or they may be admixed with said media. Generally, spraying of only the soil surface is sufficient to prevent plant growth in areas which are to be kept clear of plants. However, the emulsions may be incorporated into customarily employed temporary surfacing materials, e. g., oils, cinders, etc.

The present invention is further illustrated, but not limited, by the following example:

*Example*

Spray testing of the present herbicidal composition was conducted as follows:

A cyclohexanone solution of hexachlorocyclopentadiene or of hexachlorobutadiene and an emulsifying agent were added to water, the quantity of solution employed being calculated to give emulsions containing 1.0 per cent and 0.3 per cent, respectively of the diene, based on the total weight of each emulsion. The quantity of emulsifying agent used was 0.2 per cent by weight, based on the total weight of each emulsion. The emulsifying agent comprised a mixture of a polyalkyleneglycol derivative and an alkylbenzenesulfonate.

Three-week-old corn and bean plants were respectively sprayed with the emulsions, two plants of each variety being sprayed with each emulsion. The spraying was continued until droplets formed on and/or fell from the foliage and stems of the sprayed plants, up to 15 ml. of the emulsion being applied to each plant. The sprayed plants as well as two untreated "blank" specimens of each plant were then allowed to remain under standard conditions of sunlight and watering for a period of one week. At the end of that time the sprayed plants were compared with the untreated plants in order to determine the extent of injury, if any. The following observations were made:

| Compound Tested at Percent Concentration | Extent* of injury on— | |
|---|---|---|
| | Bean | Corn |
| Hexachlorocyclopentadiene: | | |
| 1.0 | 3 | 4, 4a |
| 0.3 | 2 | 4, 4a |
| Hexachlorobutadiene: | | |
| 1.0 | 0 | 4, 4a |
| 0.3 | 0 | 2 |

*0=no injury; 2=moderate injury; 3=severe injury; 4=plant dead; 4a=leaves dried.

The high degree of selectivity of the hexachlorobutadiene shown above as a toxicant for corn (typical of narrow-leafed plants) recommends the use of herbicidal compositions comprising this diene for the suppression or elimination of grass growth in plots of broad-leafed truck crops.

While the present dienes are most advantageously employed as herbicides by incorporating them into emulsions as herein described, they may also be employed in other plant-destroying methods. Thus, they may be incorporated into solid carriers such as clay, talc, pumice and bentonite to give herbicidal compositions which may be applied to living plants or to surfaces which are to be freed from plant growth. The dienes may also be mixed with liquid or solid agricultural pesticides, e. g., insecticides and fungicides. While solutions of the compounds in organic solvents may be employed for preventing and destroying plant growth, I have found that the emulsions possess an improved tendency to adhere to the treated surfaces and that less of the active ingredients is required to give comparable herbicidal efficiency.

What I claim is:
1. A herbicidal composition comprising an oil-in-water emulsion of hexachlorobutadiene, said hexachlorobutadiene being present in the emulsion in a quantity which is toxic to plant life.
2. The method of destroying undesirable plants which comprises applying to said plants a toxic quantity of a herbicidal composition comprising an oil-in-water emulsion of hexachlorobutadiene.
3. The method of destroying undesirable plants which comprises applying to said plants a toxic quantity of a herbicidal composition comprising hexachlorobutadiene.

References Cited in the file of this patent
UNITED STATES PATENTS

| 2,110,842 | Ressler | Mar. 8, 1938 |
| 2,140,519 | Elston | Dec. 20, 1938 |
| 2,548,509 | Yowell | Apr. 10, 1951 |
| 2,636,815 | Molnar | Apr. 28, 1953 |

FOREIGN PATENTS

| 740,232 | France | Nov. 12, 1932 |